Patented Dec. 18, 1945

2,391,358

UNITED STATES PATENT OFFICE 2,391,358

METHOD OF PREPARING CATALYST

William E. Spicer and Rhea N. Watts, Baton Rouge, La., assignors to Standard Oil Development Company, a corporation of Delaware No Drawing. Application August 29, 1941, Serial No. 408,820

6 Claims. (Cl. 252—259.3)

This invention relates to an improved method for preparing catalysts to be used in processes of the type of catalytic reforming, catalytic aromatization, catalytic dehydrogenation and the like, whether or not these processes are conducted in the presence or absence of substantial quantities of added or recirculated hydrogen.

Mixtures of aluminum oxide with oxides or sulfides of metals such as molybdenum, chromium, tungsten and vanadium, are especially useful in catalytic reactions of the type above referred to. When these catalysts are used on a small scale, such as in laboratory experiments, it is relatively unimportant whether they are prepared by expensive methods and whether they are sufficiently rugged to stand up under use for long periods without crumbling or disintegrating. However, when used on a commercial scale in large reactors or catalyst cases, the cost of the catalyst, including not only the cost of the ingredients but also the cost of its preparation in a rugged form, is a considerable item of expense and it is important to keep this cost down to a minimum if the catalytic process is to be commercially attractive.

When used in a fixed or stationary form, these catalysts are ordinarily prepared in small lumps of various shapes and sizes which are packed into the reaction chamber. There are a number of different methods for preparing catalysts in this form. Among these may be mentioned (1) impregnation of small lumps or pieces of aluminum oxide with an aqueous solution of a compound of the active metal ingredient followed by heating to decompose the metal compound; (2) co-precipitation of aluminum hydroxide and the hydroxide of the active metal ingredient from aqueous solutions of compounds of aluminum and the active metal, followed by washing, drying and molding of the precipitate; (3) mechanical mixing or kneading of the powdered ingredients of the catalyst with water or a peptizing acid to form a paste followed by extrusion of the paste into long strings which can be cut up into small pieces of various lengths; and (4) mechanical mixing or kneading of the powdered ingredients with a peptizing agent and then allowing the paste to remain in the mixing device until spherical pellets of suitable size have formed followed by the addition of a small amount of the dry, powdered ingredients to form a hard, polished surface on the pellets. This method is sometimes called the "balling method." In preparing large batches of catalyst for use in commercial plants, the third method of mixing to form a paste and then extruding is the simplest, fastest and cheapest method and it is of course desirable to use this method in preference to the others whenever possible.

As to the ingredients of the catalyst, there are many different forms of aluminum oxide which can be used, such as hydrates of alumina, bauxite, alumina gels, peptized alumina gels and Activated Alumina. The hydrates of alumina and bauxite are the cheapest forms of alumina available commercially so that it is naturally desirable to use these materials in preference to other forms of alumina provided catalysts of sufficient activity can be prepared from them.

We have found that when using hydrates of alumina or bauxite as the base material for the catalyst, it is not always possible to prepare the catalyst by the extrusion method because the paste of the ingredients does not have sufficient cohesive properties to prevent its disintegration after being extruded. Thus, for example, a mixture of alumina hydrate and about 9-10% molybdenum oxide cannot be satisfactorily extruded. In order to prepare a catalyst from this mixture, the more expensive balling method must be used in which the paste is placed in a mixing device such as a Simpson mixer.

We have now found that alumina hydrate and mixtures thereof with other metallic ingredients such as molybdenum oxide may be made adaptable to the desirable extrusion technique by using chromic acid as the wetting agent for the preparation of the paste to be extruded. Chromic acid ($H_2CrO_4$) is readily prepared by dissolving chromium trioxide ($CrO_3$) in water. The extruded pellets are then dried and activated by heating to between 800 and 1200° F. The same treatment applied to bauxite also markedly increases its adaptability to the extrusion technique. It will be understood that while the present method is particularly useful in connection with the cheaper forms of alumina such as alumina hydrates and bauxite, it may also be applied to other forms of alumina such as Activated Alumina, alumina gels and peptized alumina to improve or increase their adaptability to extrusion.

The method of preparing a catalyst or catalyst base according to this method will be fully understood from the following description:

Alumina hydrate as obtained commercially is reduced to a fine powder. This powder is then mixed with chromic acid in such amounts that the mixture when kneaded together will form a plastic mass of the proper consistency for extrusion. The concentration of chromium trioxide in the chromic acid may be regulated so that a sufficient amount of chromic oxide will be available to give the desired effect. In most cases it is found that a chromic oxide content of from 3–20% by weight based on the dried catalyst gives the best results. Following the formation of a mixture of suitable consistency, the paste is passed through an extrusion means and the strings or ribbons of extruded paste are cut up into short lengths, say of ⅛ to ¼ inch. The extruded pellets are then dried in a steam oven or other suitable means and finally heated in a furnace to about 800 to 1200° F. and held at this temperature until the moisture content has been reduced to a level such that the pellets are rugged and hard and do not powder or crumble on being packed into a reaction chamber.

Following the preparation of pellets in the manner just described, they may be impregnated with an aqueous solution of a compound of another active metal such as molybdenum, the impregnated pellets dried and finally heated to convert the active metal compound to the oxide. Alternatively and preferably, the solution of the compound of the active metal may be incorporated with the powdered alumina hydrate and the chromic acid and the whole mass kneaded together to form a paste of suitable consistency for extruding. In this case, it will be understood that the concentration of the chromium trioxide and the other metal compound in the solutions will be adjusted vis-a-vis the quantity of water reqired for forming a suitable paste so that the amount of chromic oxide will be sufficient to produce the desired effect.

Although molybdenum oxide has been referred to specifically as one of the active metal oxides which may be incorporated with the alumina hydrate-chromic acid base, it should be understood that many other oxides or sulfides may also be used. For example, the oxides or sulfides of metals of the IV, V, VI, and VIII groups of the periodic system all have some catalytic activity in promoting reactions of the type of reforming, aromatization, and dehydrogenation and may be incorporated with the alumina hydrate-chromic acid in amounts from 1 to 40% by weight. The method of preparing catalysts with these other metal oxides and sulfides is generally essentially the same as that described above in connection with molybdenum oxide.

This invention is not limited by any theories of the mechanism of the reactions nor by any details which have been given merely for purposes of illustration but is limited only in and by the following claims in which it is intended to claim all novelty inherent in the invention.

We claim:

1. The method of preparing an alumina hydrate catalyst composition in the form of pellets of controlled size and shape, suitable for use in a process of the type of catalytic reforming, catalytic dehydrogenation and catalytic aromatization, which comprises forming an extrudable paste by mixing finely divided alumina hydrate with an aqueous solution of chromium trioxide, extruding said paste through an orifice of suitable size and shape, cutting the extruded mass into pieces of short length, drying said pieces, and heating the dried pieces to a temperature between about 800° and about 1200° F. until the pieces are hard and rugged.

2. Method according to claim 1 in which the quantity of chromic acid and the concentration of chromium trioxide therein are so adjusted that the mixture of powdered alumina hydrate and chromic acid, when kneaded together, will result in a paste of the proper consistency for extrusion and the quantity of chromic oxide after the heating step will constitute between 4 and 20% by weight of the dried catalyst.

3. The method of preparing a catalyst for use in processes of the type of catalytic reforming, catalytic dehydrogenation and catalytic aromatization which comprises kneading together a mixture of powdered alumina hydrate, chromic acid and an aqueous solution of a compound of a metal selected from the group consisting of metals of the IV, V, VI and VIII groups of the periodic system, other than aluminum or chromium, adjusting the quantity of chromic acid and the metal compound solution so that a paste of suitable consistency for extrusion is obtained, forcing the paste through an extrusion means, cutting the extruded mass into pieces of short length, drying the pieces and subjecting the dried pieces to a temperature between about 800° F. and 1200° F. for a time at least sufficient to convert the metal compound to the corresponding oxide, the quantity of chromic acid used being such as will form an amount of $Cr_2O_3$, after heating, which is not substantially greater than 20% by weight of the catalyst mass.

4. Method according to claim 3 in which the concentration of the chromium trioxide in the chromic acid and the concentration of the metal compound in the metal compound solution are adjusted so that the final dried and heated pieces will contain between 4 and 20% by weight each of chromic oxide and the oxide corresponding to the metal compound other than the compounds of aluminum and chromium.

5. Method according to claim 3 in which the metal compound is a compound of molybdenum.

6. Method according to claim 1 in which the extruded pieces, after drying and heating, are impregnated with an aqueous solution of a compound of another active metal and then further dried and heated to convert the active metal compound to the oxide.

WILLIAM E. SPICER.
RHEA N. WATTS.